March 6, 1962 E. K. ZINDEL 3,023,874
VENDING MACHINE WITH TIME CONTROLLED COIN RETURN
Filed April 14, 1959 10 Sheets-Sheet 1

INVENTOR
ERNST KARL ZINDEL
BY
ATTORNEYS

March 6, 1962 E. K. ZINDEL 3,023,874
VENDING MACHINE WITH TIME CONTROLLED COIN RETURN
Filed April 14, 1959 10 Sheets-Sheet 4

INVENTOR
ERNST KARL ZINDEL
BY
ATTORNEYS

March 6, 1962     E. K. ZINDEL     3,023,874
VENDING MACHINE WITH TIME CONTROLLED COIN RETURN
Filed April 14, 1959     10 Sheets-Sheet 5

INVENTOR
ERNST KARL ZINDEL
BY     ATTORNEYS

March 6, 1962 E. K. ZINDEL 3,023,874
VENDING MACHINE WITH TIME CONTROLLED COIN RETURN
Filed April 14, 1959 10 Sheets-Sheet 6

INVENTOR
ERNST KARL ZINDEL
BY
ATTORNEYS

March 6, 1962 E. K. ZINDEL 3,023,874
VENDING MACHINE WITH TIME CONTROLLED COIN RETURN
Filed April 14, 1959 10 Sheets-Sheet 8

INVENTOR
ERNST KARL ZINDEL
BY
ATTORNEYS

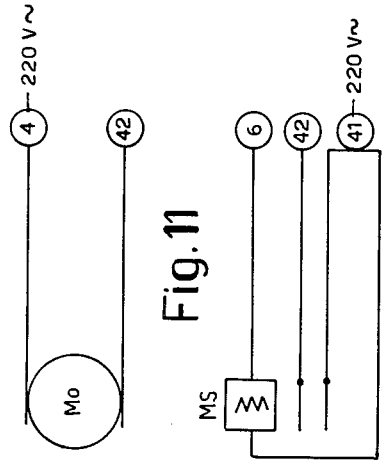
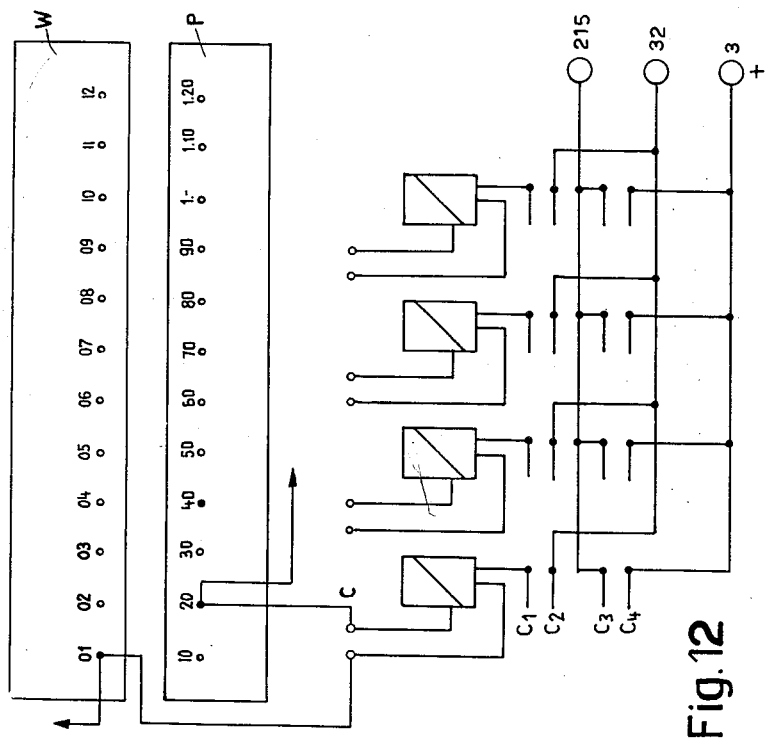

3,023,874
Patented Mar. 6, 1962

3,023,874
VENDING MACHINE WITH TIME CONTROLLED COIN RETURN
Ernst Karl Zindel, Blasistr. 31, Zurich, Switzerland
Filed Apr. 14, 1959, Ser. No. 806,263
Claims priority, application Switzerland Feb. 10, 1959
7 Claims. (Cl. 194—10)

The present invention relates to a computing electrical device for an automatic dispenser or retailer. In the following the term "dispenser" shall include apparatus as they are widely used in front of shops for selling goods such as feed or smoked goods when the shop is closed. Such "dispensers" as they are referred to in the following description could also be placed for example in a theatre of the like to automatically sell tickets. The term "goods" as far as it is used in connection with a dispenser in the following descripiton and claims shall therefore be taken in its widest sense.

The prime object of the present invention is to realize a control device affording for a fully automatic operation of a dispenser.

To this end the device according to the invention comprises a goods selector and a first detector or finder connected with the selector over an adjustable price table, said detector receiving pulses from a pulse analyzer according to the money inserted into the dispenser and liberating or releasing the goods over a relay only after the required amount is attained, a second detector being provided which is arranged to scan a store connected with the first detector and which is adapted to store pulses corresponding to the amount in excess of the amount required, said second detector controlling a coin delivering device so as to return the amount of money inserted in excess.

Figure 1:
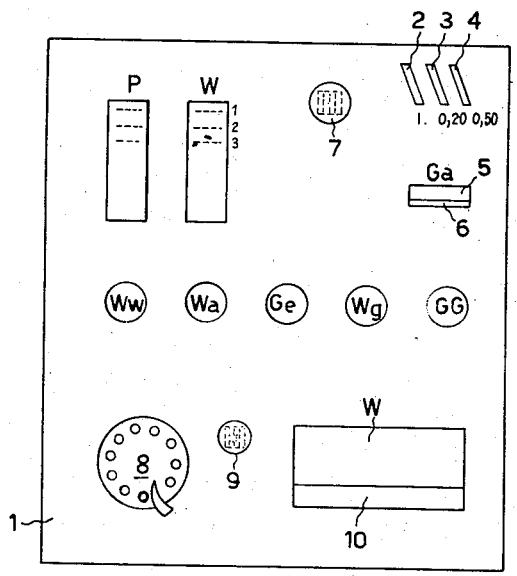
Figure 2:
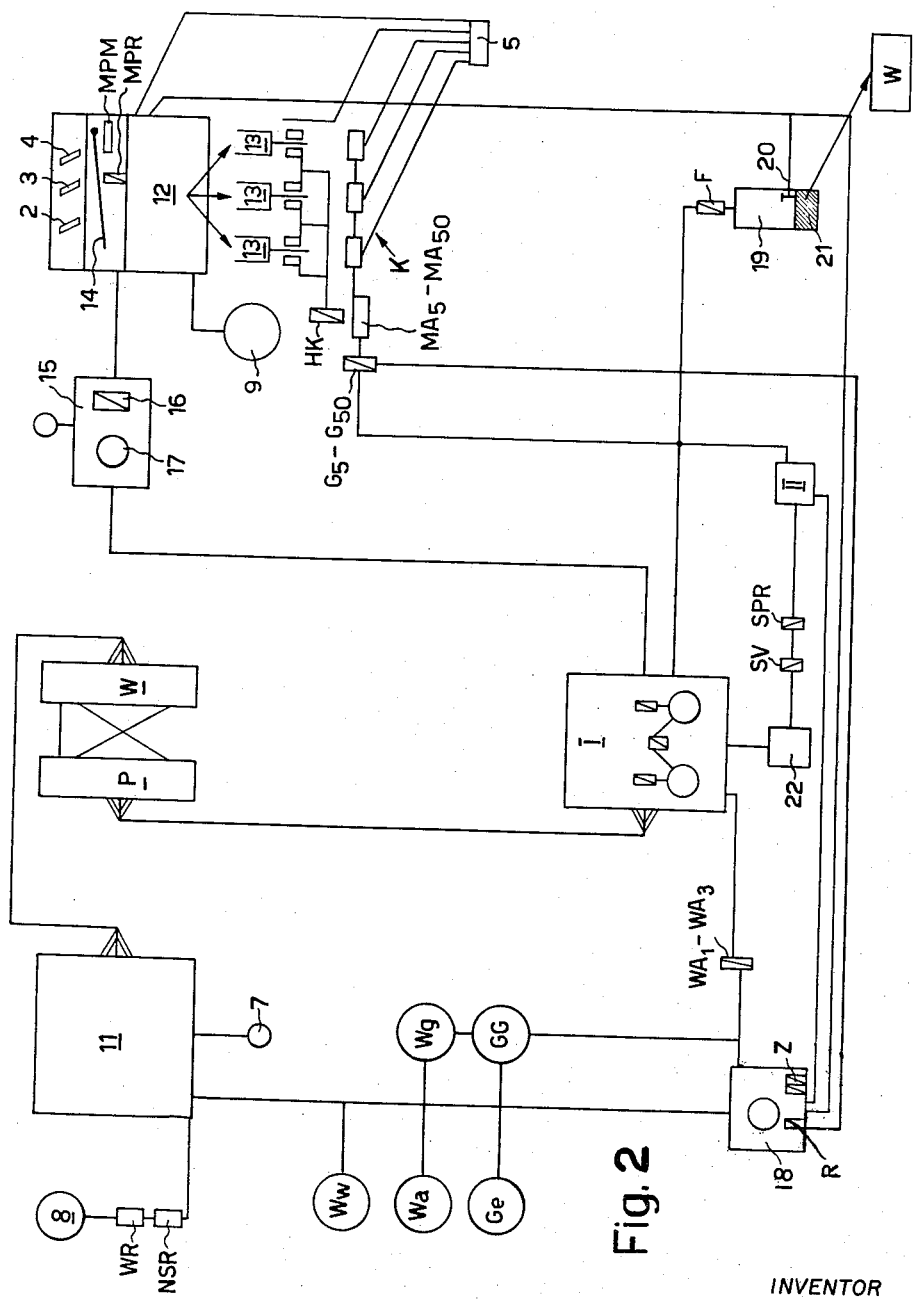
Figure 3:
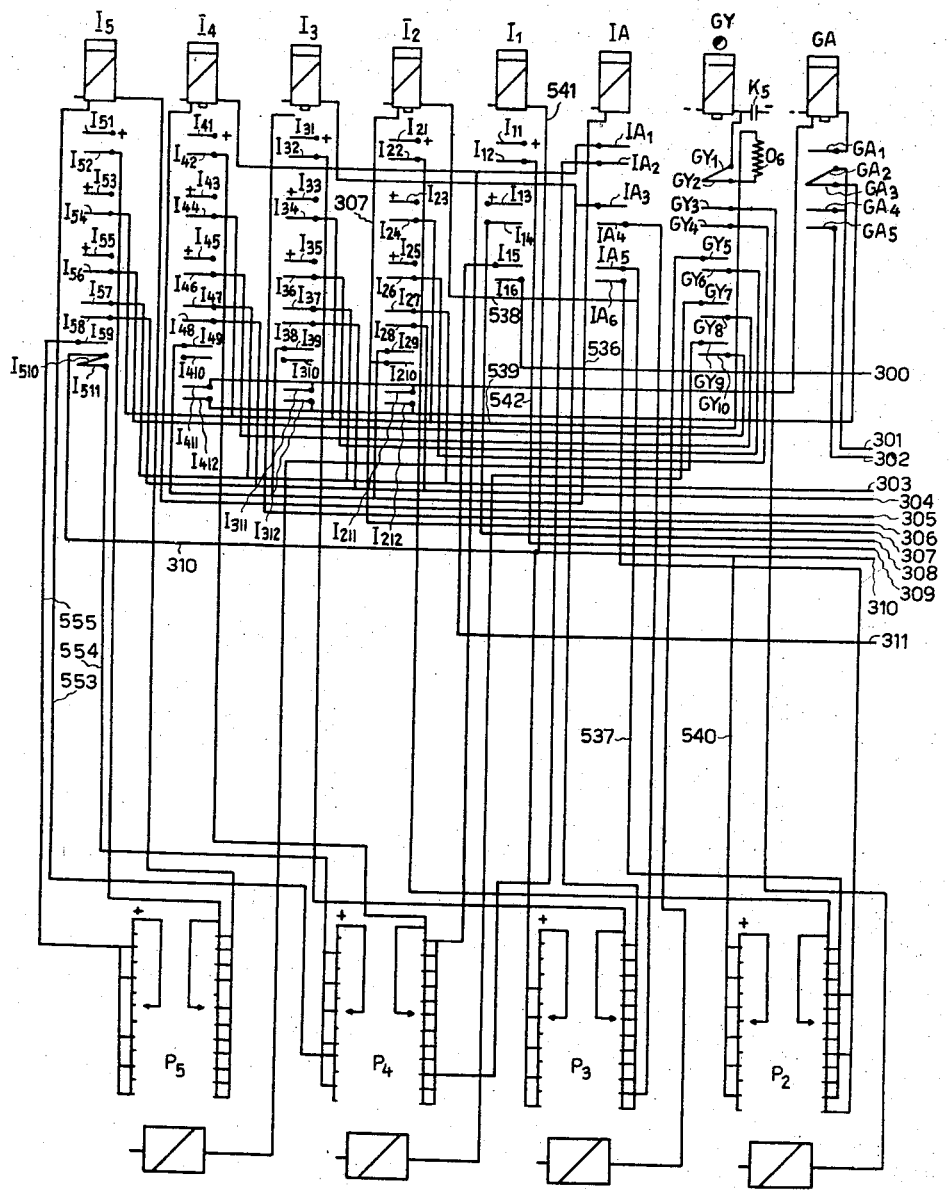
Figure 4:
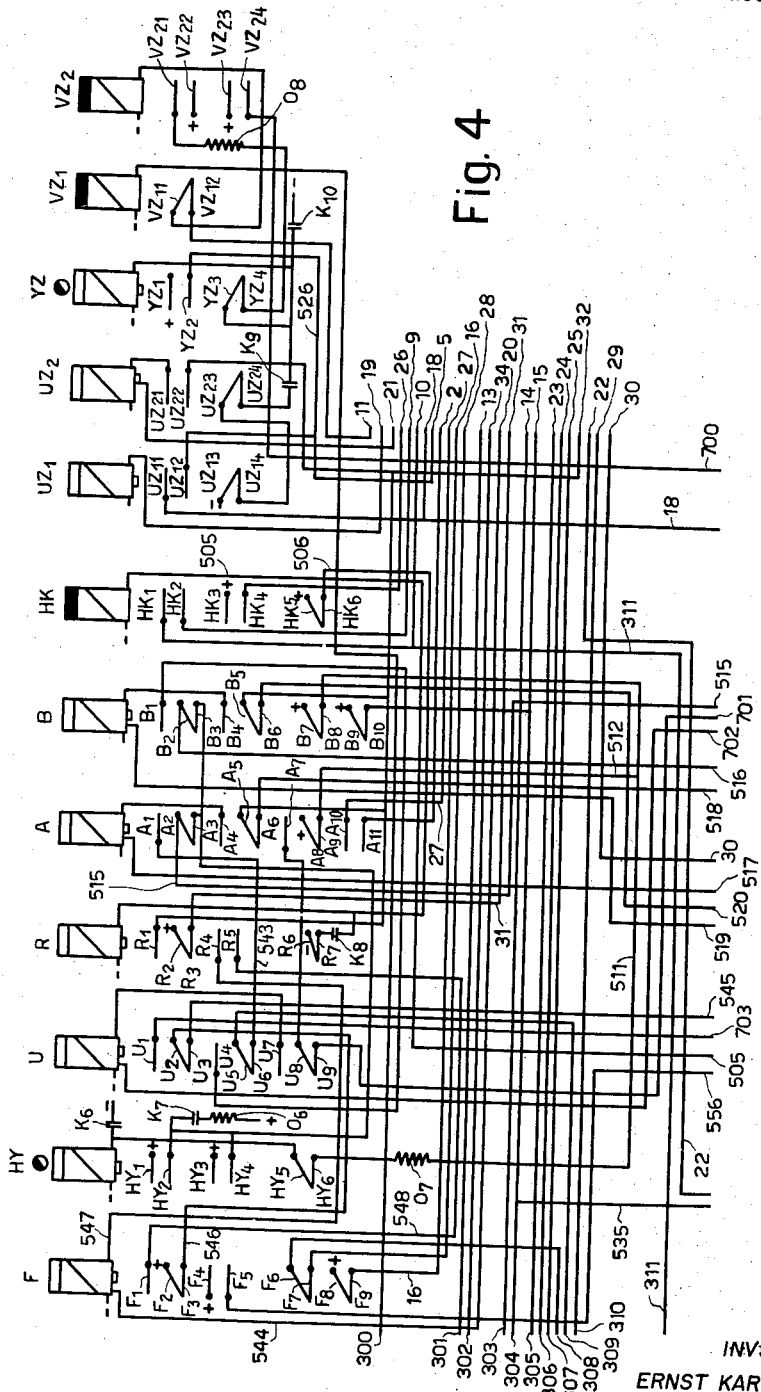
Figure 6:
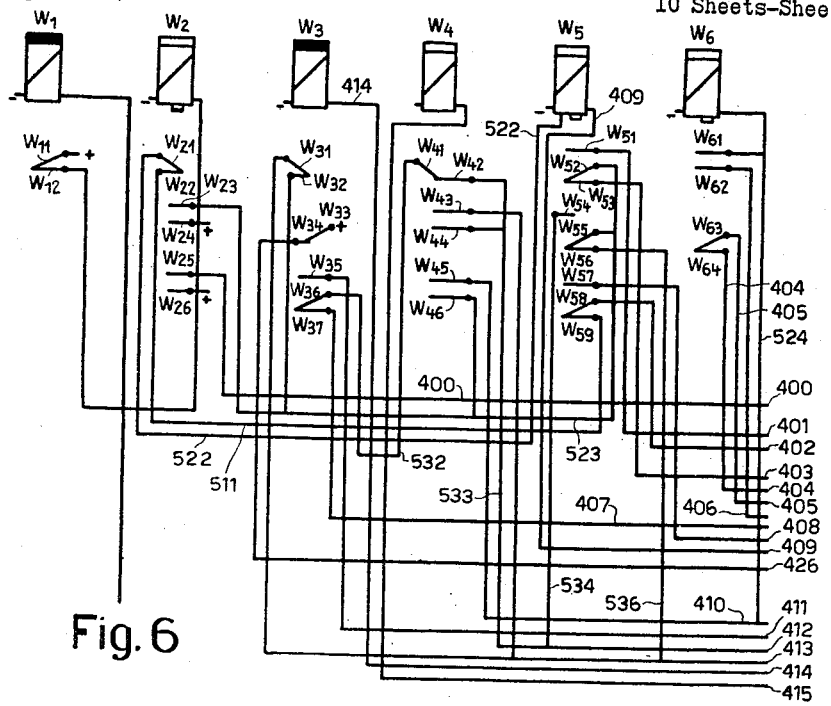
Figure 5:
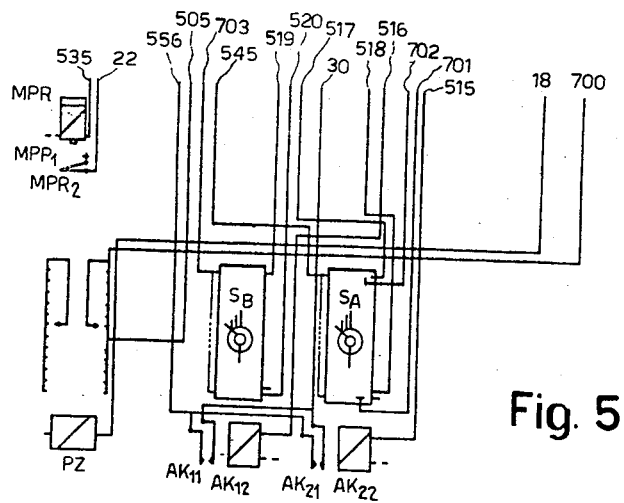
Figure 7:
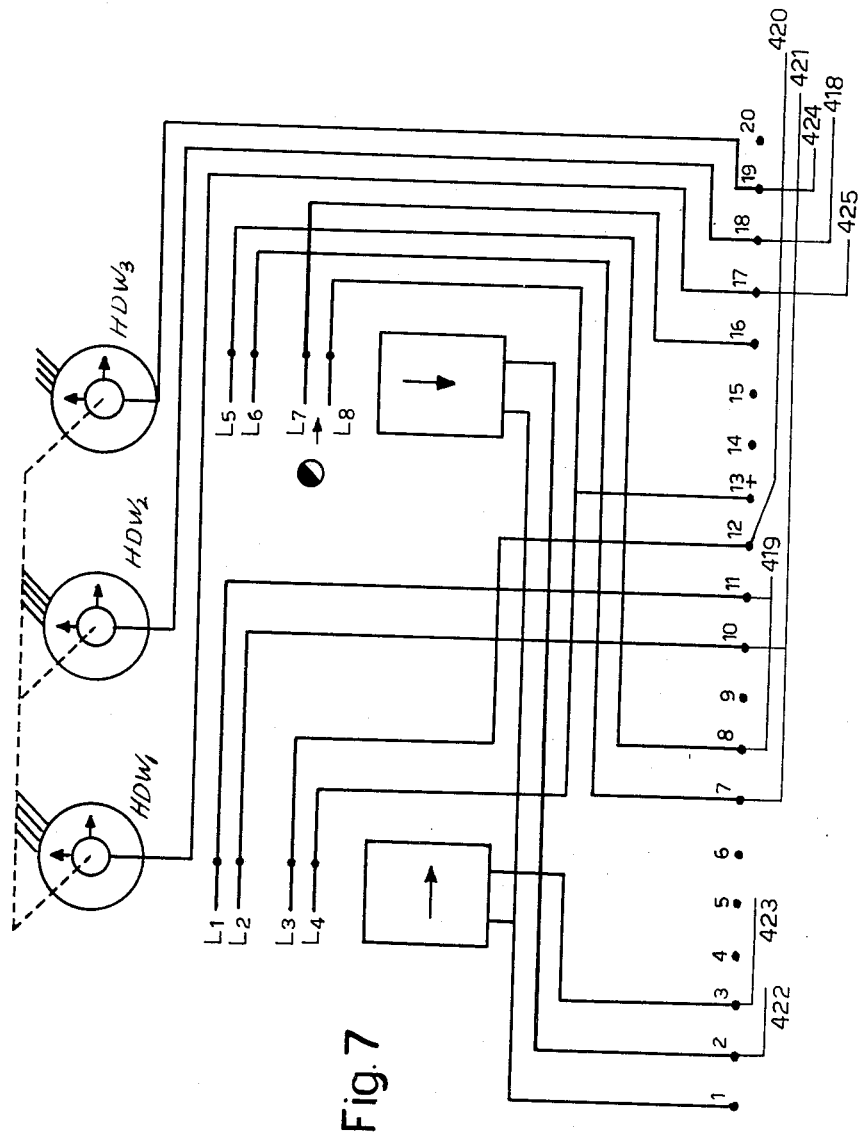
Figure 8:
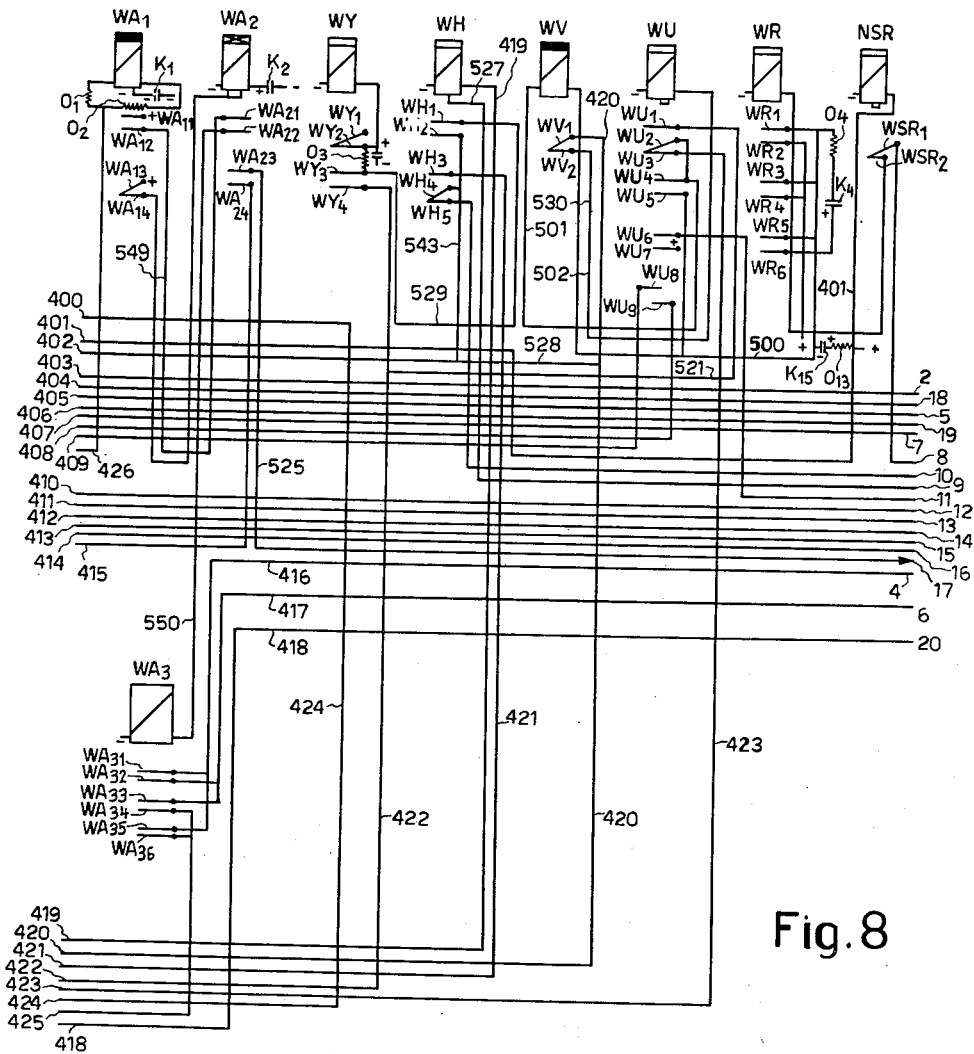
Figure 9:
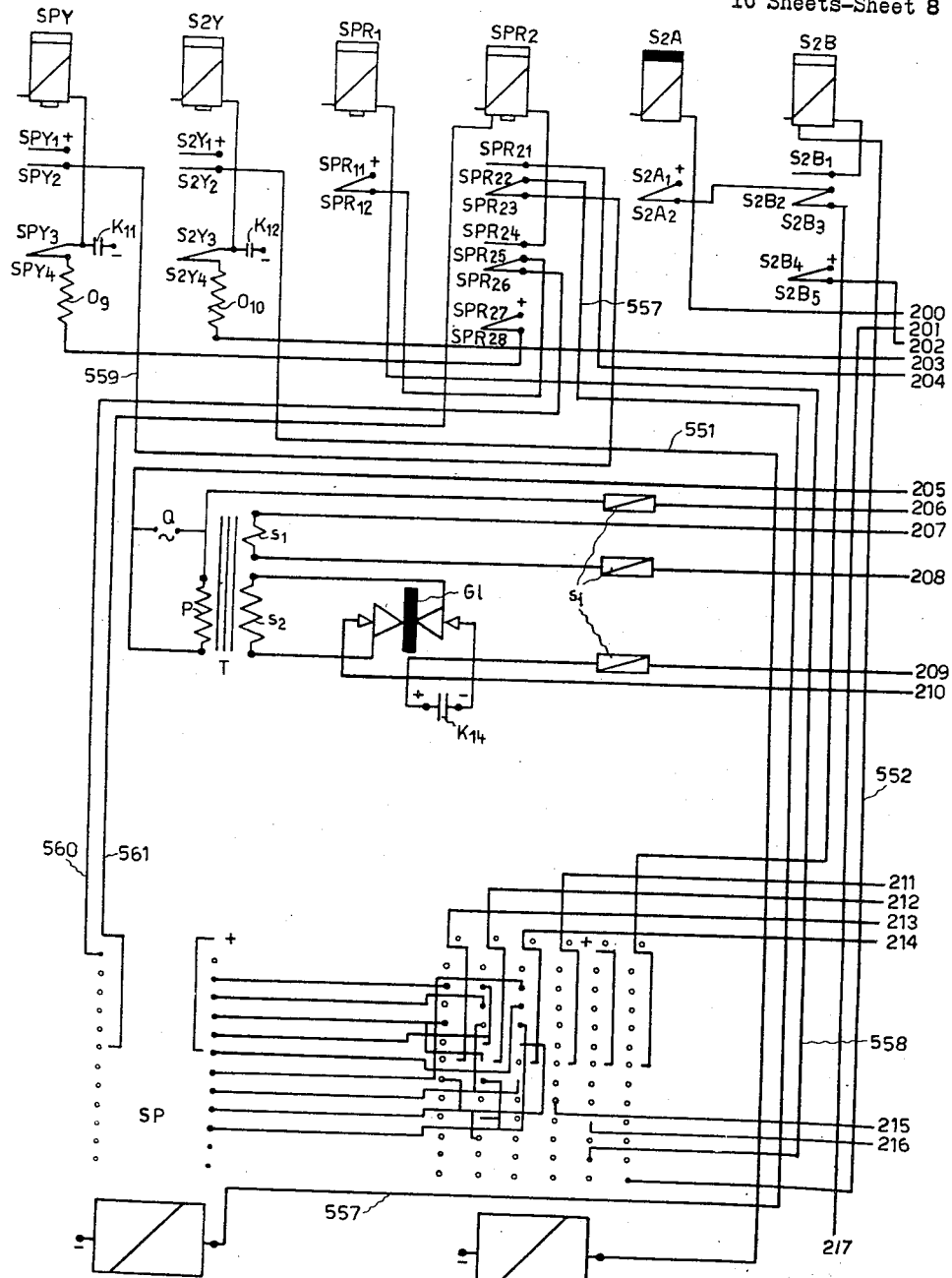
Figure 10:
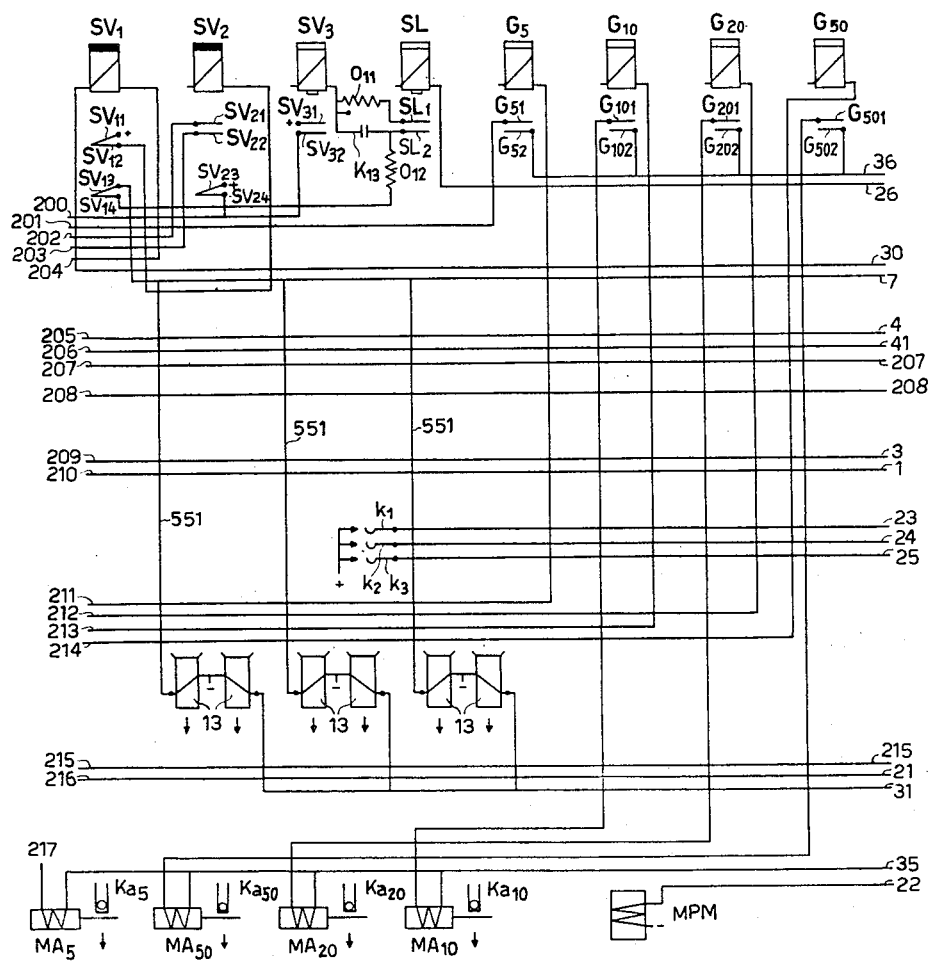

Other features and advantages of the invention shall become apparent from the description, now to follow, of a preferred embodiment thereof, in which reference will be made to the accompanying drawings, in which:

FIGURE 1 illustrates the front wall of a goods dispenser or retailer,
FIGURE 2 is a block diagram of this apparatus,
FIGURE 3 shows the pulse analyzer,
FIGURE 4 illustrates different relay groups,
FIGURE 5 represents the first detector, the timer and the control relay of the coin-insert lock,
FIGURE 6 shows a relay group of the goods selector,
FIGURE 7 shows a second relay group of the goods selector and a slagged relay group,
FIGURE 8 shows the second detector, the store, the relay group associated thereto and the power supply,
FIGURE 9 shows the till, the coin ejector and the relay group associated thereto,
FIGURE 10 shows the connection of the driving motor for a conveyor belt,
FIGURE 11 illustrates the connection of the relay group for the delivery of the 5-cent coins, and
FIGURE 12 shows another diagram.

The apparatus described hereafter in detail in order to illustrate the present invention is designed and constructed for operation with Swiss money based on the metrical system and having the following coins:

5 cents, 10 cents, 20 cents, 50 cents
1 franc=100 cents

Referring now to the drawings, in FIGURE 1 reference numeral 1 designates the front wall of the represented goods retail or dispenser provided with three slots 2, 3, 4, for the coins 20 cents, 50 cents and 1 franc. Below these slots is arranged an opening 5 having a retaining rim 6 for the delivered change. At the left of the slots 2–4 there are arranged two panels or tables P and W. The table or panel W contains the list of the goods to each of which is associated a number and the panel or table P indicates the price of the different goods. The amount paid, i.e. inserted in the slots 2–4 is indicated by a counter 7. The desired goods is marked on an indicator 9 for checking purposes. The goods is delivered through an opening W provided with a retaining rim 10. There are further provided five check tables or lamps giving different indications necessary for the handling of the apparatus. When these tables are lighted the following indications become visible:

$Ww$: select the goods
$Wa$: goods sold-out
$Ge$: insert money
$Wg$: not enough money
$GG$: enough money The different parts of the apparatus shall first be described with reference to the block diagram of FIGURE 2.

The selector disk or dial 8 is connected with the goods selector 11 over two relays WR and NSR. The goods selector 11 in turn is connected over the tables P and W with a first detector 1.

The slots 2, 3, 4 are arranged at a so-called "coin-tester." This is a well-known device adapted to check the received coins and to classify them. By this device the coins are classified in money clippers 13 which guide them either into the till K of the apparatus or to the opening 5. The clippers 13 are actuated by means of magnets controlled by a relay HK. In the till K the coins are stored in different containers $Ka_5$, $Ka_{10}$, $Ka_{20}$, $Ka_{50}$. The money delivery is effected by means of magnetical coin ejectors $MA_5$–$MA_{50}$ arranged at the containers Ka and controlled by relays $G_5$–$G_{50}$. The coin-tester is further provided with a lock 14 operated by a magnet MPM controlled by a relay MPR. The inserted coins may therefore selectably be guided either into the clippers 13 or directly into the opening 5.

Contacts $k_1$, $k_2$, $k_3$, are arranged at the end of the classifying channels of the coin-tester 12. These contacts are closed by the coins rolling by and thus produce a pulse for each passing coin. These pulses are analyzed in a pulse analyzer 15 by a relay 16 and are transmitted by a dial selector 17. The pulses ascertained by the pulse analyzer 15 are guided over a relay $I_A$ to the detector I which compares the sum of the inserted coins with the price of the selected goods. A timer 18 is controlled by a relay group Z. At the end of its movements, the timer 18 actuates a relay R which controls the resetting of the whole apparatus to the starting position. The detector I is connected with the timer 18 over a slagged or retardation relay group $WA_1$–$WA_3$.

The shafts for the goods are diagrammatically shown at 19. They are provided with a feeler 20 arranged to ascertain the presence of the goods. Should the goods be sold out the feelers 20 operate the lock 14 and the timer Z.

If the presence of the goods is ascertained and the price is paid the ejection magnets 21 are operated by a relay F. If the amount paid exceeds the price of the selected goods the change is delivered over a store 22, two relay groups SV, SPR, a second detector II and the already mentioned relays $G_5$–$G_{50}$. The latter as well as the detector II are also connected with the timer 18. The different elements and their connections shall now be described in detail with reference to FIGURES 3–9.

The goods selector 11 (FIGS. 6–8) consists of a dial selector having three parts $HDW_1$, $HDW_2$ and $HDW_3$. Each position of this dial selector corresponds to the number of goods. These three parts represented as lying side by side are actually arranged coaxially. Part $HDW_1$ is connected to the ejector 21 over a lead 41, part $HDW_2$ is connected to the detector I over the tables W, P and part $HDW_3$ is connected to the feelers 19. Moreover the dial selector is provided with a pair of magnet coils with cores providing in a known manner the displacement of the segments. The first coil serves to set off the first digit of the number of the goods. As soon as it is excited the contact pairs $L_1$, $L_2$, $L_3$, $L_4$ remain closed. The second coil serves to set the second digit. The contacts $L_7$, $L_8$ are closed and opened in accordance with this second digit. The contact $L_7$ is connected in a not represented manner over the 16th contact of the dial selector HDW with the relay $W_1$ (FIG. 1). The pair of contacts $L_5$, $L_6$ remains closed when the coil is excited.

The goods selector further comprises the relay group $W_1-W_6$ (FIG. 6) WY–WH and WU–WV (FIG. 8). The relay $W_1$ is a slow dropping relay having two contacts $W_{11}$ and $W_{12}$, which are closed in the rest position. The relay $W_2$ is a normal relay having six contacts. The contacts $W_{21}$, $W_{22}$ are break contacts, the contacts $W_{23}$, $W_{25}$ are operating contacts, i.e. they are open in the rest position and the contacts $W_{24}$, $W_{26}$ are operating contacts connected to the positive pole. The relay $W_3$ is a slow dropping relay having seven contacts. The contacts $W_{31}-W_{32}$ and $W_{34}-W_{35}$ form break contacts, whereby $W_{35}$ is connected to the positive pole. The contacts $W_{35}$, $W_{36}$, $W_{37}$ form switch-over contacts whereby the break contact pair is formed by the contacts $W_{36}-W_{37}$. The relay $W_4$ is a normal relay with a break contact pair $W_{41}$, $W_{42}$ and four operating contacts $W_{43}$, $W_{44}$, $W_{45}$ and $W_{46}$. The relay $W_5$ is a normal relay having three switch contact groups $W_{51}-W_{52}-W_{53}$, $W_{54}-W_{55}-W_{56}$, $W_{57}-W_{58}-W_{59}$. The last two contacts of each group form the break contacts. The relay $W_6$ is a normal relay having two operating contacts $W_{61}$, $W_{62}$ and two break contacts $W_{63}$, $W_{64}$.

The relays WY, WH, WV, WU are represented in FIGURE 4. The connections between the figures 3, 4 are numerated from 400 to 424.

The relay WY is constructed as a pulse generator. It comprises a break contact pair $WY_1$, $WY_2$ and an operating contact pair $WY_3$, $WY_4$. A condenser $K_3$ is connected to the contact $WY_1$ while a resistance $O_3$ is arranged between the contacts $WY_3$ and $WY_4$. The relay WH is a normal relay serving as retaining relay. It comprises a pair of operating contacts $WH_1$, $WH_2$ and a change-over contact group $WH_3-WH_4-WH_5$ whereby $WH_4-WH_5$ forms the pair of break contacts. The relay WV is a time-delay relay having a pair of break contacts $WV_1$, $WV_2$. The relay WU is a normal relay having a change-over contact group $WU_1-WU_2-WU_3$ and six operating contacts $WU_4$, $WU_5$, $WU_6$, $WU_7$, $WU_8$, $WU_9$. The relays WY, WH, WV and WU control the return of the goods selector 11.

There is further provided a relay group WA (FIG. 8) consisting of three relays $WA_1$, $WA_2$ and $WA_3$. The relay $WA_1$ is a slagged relay provided with a separate current circuit, into which there are connected a condenser $K_1$ and a pair of resistances $O_1$ and $O_2$. The relay $WA_1$ comprises a pair of operating contacts $WA_{11}$, $WA_{12}$ and a pair of break contacts $WA_{13}$, $WA_{14}$. The relay $WA_2$ is a slow-acting relay to which is connected a condenser $K_2$. It comprises four operating contacts $WA_{21}$, $WA_{22}$, $WA_{23}$, and $WA_{24}$. The operating contacts $WA_{31}-WA_{36}$ of relay $WA_3$ control the current supply to the ejector magnets 21.

The WR (FIG. 8) is the actual selector relay. Its six operating contacts $WR_1-WR_6$ are coupled in pairs whereby a resistance $O_4$ and a condenser $K_4$ are connected in series between $WR_1$ and $WR_6$. The relay NSR is connected in series with the relay WR. It comprises only a pair of break contacts $NSR_1$, $NSR_2$. Between these relays there are furthermore connected a condenser $K_{15}$ and a resistance $O_{13}$.

FIGURE 3 illustrates the analyzer 15. The relays $I_1-I_5$ receive pulses over the leads 305, 306, 307 and the connections from the contacts $k_1$, $k_2$, $k_3$ arranged at the ends of the classifying channels.

The relay $I_1$ is a normal relay having six operating contacts $I_{11}-I_{16}$. It supplies a pulse for each 10 cent coin. In the represented embodiment this relay serves only for the change delivery. It could of course also be connected to a fourth classifying channel for 10 cent coins not represented here. The relay $I_2$ comprises twelve operating contacts $I_{21}-I_{212}$. The relay $I_3$ also comprises twelve operating contacts $I_{31}-I_{312}$. The relay $I_4$ has twelve operating contacts $I_{41}-I_{412}$ and is coupled to the relay $I_5$. The latter comprises eight operating contacts $I_{51}-I_{58}$ and three change-over contacts $I_{59}$, $I_{510}$, $I_{511}$.

The analyzer 15 further comprises four dial selectors $P_2-P_5$ controlled from the relays $I_2-I_5$. The relay $I_2$ controls the dial selector $P_2$, the relay $I_3$ controls the dial $P_3$ and the relays $I_4$, $I_5$ control the dial selectors $P_4$ and $P_5$, respectively. As already mentioned the relay $I_1$ supplies a pulse for each 10 cent coin. For each 20 cent coin the relay $I_2$ excites the dial $P_2$ which supplies two pulses. For each 50 cent coin the relay $I_3$ excites the dial $P_3$ which supplies five pulses. For each 1 franc coin the relays $I_4$, $I_5$ excite the dials $P_4$, $P_5$ which together supply ten pulses. The pulses supplied by the relays $I_1$ and from the dials $P_2-P_5$ are directed to the detector I over a relay IA. The relay IA is a normal relay having six operating contacts $IA_1-IA_6$. The dials $P_2-P_5$ are switched-in and -out by a relay GY designed as a generator. The relay GY itself is controlled by the relays $I_2-I_3$. It is connected with a generating circuit comprising a condenser $K_6$ and a resistance $O_6$. It comprises a pair of break contacts $GY_1$ and $GY_2$ and eight operating contacts $GY_3-GY_{10}$.

FIGURE 3 further shows a relay GA having a change-over contact group $GA_1-GA_3$ and two operating contacts $GA_4$, $GA_5$. This relay serves, as will be explained later-on, to indicate: "Not enough money" or "Enough money."

FIGURE 5 represents the detector I. It consists of two dial selectors $S_A$ and $S_B$ supplied with pulses from the IA. The detector I further comprises two pairs of counter contacts $AK_{11}$, $AK_{12}$ and $AK_{21}$, $AK_{22}$. For each dial selector there is provided a holding relay A and B, respectively (FIG. 4). The relay A comprises two operating contacts $A_{10}$, $A_{11}$ and three change-over contact groups $A_1-A_3$, $A_4-A_6$ and $A_7-A_9$. The relay B is provided with two change-over contact groups $B_1-B_2$, $B_4-B_6$ and with two pairs of break contacts $B_7-B_8$ and $B_9-B_{10}$. There is furthermore provided a change-over relay U switching from the dial selector $S_A$ to the dial selector $S_B$. This relay U comprises three change-over contact groups $U_1-U_3$, $U_4-U_6$ and $U_7-U_9$. The relay HY (FIG. 4) is constructed as a generator and is adapted to control the resetting of detector I. It is connected with the negative pole over a condenser $O_6$. It further comprises four operating contacts $HY_1-HY_4$ and a pair of break contacts $HY_5-HY_6$. The contacts $HY_1$, $HY_3$ are also directly connected with the positive pole. The contact $HY_6$ is connected with the contacts $A_9$ and $B_8$ over a resistance $O_7$ and leads 512 and 513, respectively. As soon as the detector has ascertained that enough money has been inserted it produces the excitement of relay F (FIG. 4) which release the delivery of the goods. The relay F has a change-over contact group $F_1-F_3$, two operating contacts $F_4$, $F_5$ and two pairs of break contacts $F_6$, $F_7$ and $F_8$, $F_9$.

The relay MPR (FIG. 5) is the coin tester relay controlling the lock 14 of the coin tester 12 over a magnet MPM (FIG. 10). It comprises a break contact pair $MPR_1$, $MPR_2$.

FIGURES 4 and 5 further illustrate the timer 18 comprising a dial selector PZ (FIG. 5), five relays $UZ_1$, $UZ_2$, YZ, VZ, $VZ_2$ and the relay R (FIG. 4).

The relay R is a limit switch relay. After the time interval ascertained by the timer it is excited and switches the whole apparatus to reset. To this end this relay comprises a change-over contact group $R_1$–$R_3$, two operating contacts $R_4$, $R_5$ and a pair of break contacts $R_6$–$R_7$. A condenser $K_8$ is connected with the contact $R_7$.

The relay $UZ_1$, including two operating contacts $UZ_{11}$, $UZ_{12}$ and a pair of break contacts $UZ_{13}$, $UZ_{14}$ switches the dial selector PZ to "rush" if there is no goods in the selected shaft 19. The relay $UZ_2$ with two operating contacts $UZ_{21}$, $UZ_{22}$ and a pair of break contacts $UZ_{23}$, $UZ_{24}$ switches-in R after $UZ_1$ has been excited. The relay YZ is constructed as generator and comprises two operating contacts $YZ_1$, $YZ_2$ and a pair of break contacts $YZ_3$, $YZ_4$. It supplies PZ with pulses for the slow timing-action. $UZ_{24}$ and $YZ_4$ are connected together and with the negative pole with a pair of condensers $K_9$, $K_{10}$ connected intermediately. $VZ_1$, $VZ_2$ are auxiliary relays for setting the rapid or slow resetting. $VZ_1$ comprises only one pair of break contacts $VZ_{11}$, $VZ_{12}$ while $VZ_2$ has four operating contacts $VZ_{21}$–$VZ_{24}$. The contact $VZ_{21}$ is connected with the contact $YZ_4$ over a resistance $O_6$.

The further relay HK also visible in FIGURE 4 is a slagged relay serving to the control of the clippers 13. It comprises four operating contacts $HK_1$–$HK_4$ and a pair of break contacts $HK_5$ and $HK_6$.

FIGURE 9 illustrates the store 22 and the detector II. The store 22 consists of a two-part dial selector SP and the detector II consists of a six-part dial selector $S_2$. The different relays for the control of these devices are shown in the upper portion of FIGURE 9.

The relay SPY comprises two operating contacts $SPY_1$, $SPY_2$ and a pair of break contacts $SPY_2$, $SPY_4$. The contact $SPY_3$ is connected with the negative pole over a condenser $K_{11}$. Contact $SPY_4$ is connected over a resistance $O_9$ with the contact $SPR_{28}$ of the hereafter described relay $SPY_2$. This relay SPY operates as a generator for the resetting of the store. The relay S2Y serves as a generator for the detector II. It comprises two operating contacts $S2Y_1$, $S2Y_2$ and a pair of break contact $S2Y_3$, $S2Y_4$. The contact $S2Y_3$ is connected with the negative pole over a condenser $K_{12}$ and the contact $S2Y_4$ is connected over a resistance $O_{10}$ with the contact $SV_{22}$ of the hereafter described relay $SV_2$.

The relays $SPR_1$ and $SPR_2$ serve to change-over from store 22 to detector II. The relay $SPR_1$ includes a pair of break contacts $SPR_{21}$–$SPR_{22}$–$SPR_{23}$, $SPR_{24}$–$SPR_{25}$–$SPR_{26}$ and a pair of break contacts $SPR_{27}$, $SPR_{28}$.

The relays S2A and S2B are connected with the detector II. The relay S2A is a slagged relay having a pair of break contacts $S2A_1$, $S2A_2$. The relay S2B is a normal relay having a change-over contact group $S2B_1$–$S2B_2$–$S2B_3$ and a pair of break contacts $S2B_4$, $S2B_5$.

FIGURE 9 also shows the mains portion of the apparatus. A transformer T is connected to an A.C. source Q. The transformer comprises two secondary windings $s_1$, $s_2$. The secondary winding $s_1$ supplies an alternating current of e.g. 24 volts for the hereafter described magnets $MA_5$–$MA_{50}$ of the till K. The secondary winding $s_2$ is connected with a rectifier G1 having a selenium smoothing condenser $K_{14}$. It supplies a direct current of e.g. 48 volts for the whole apparatus the goods ejector 21 excepted. The latter is directly connected with the source Q.

The relay group $SV_1$, $SV_2$, $SV_3$ and SL illustrated in FIGURE 10 also serves to the operation of the detector II. The relays $SV_1$ and $SV_2$ are slagged relays, whereby the first comprises two pairs of break contacts $SV_{11}$–$SV_{12}$, $SV_{13}$–$SV_{14}$ and the second two operating contacts $SV_{21}$, $SV_{22}$ and a pair of break contacts $SV_{23}$–$SV_{24}$. The relay $SV_3$ is connected with the contact $S1_1$ over a resistance $O_{11}$ and with the contact $S1_2$ over a condenser $K_{13}$. Contact $S1_2$ is further connected with contact $SV_{14}$ over a resistance $O_{12}$.

The clippers 13—with their magnets as already described controlled by relay HK—are arranged below the not represented classifying channels of the coin-tester 12 at the end of which there are provided the contacts $k_1$, $k_2$, $k_3$. The till is arranged underneath the clippers 13. This till consists of a not represented container for the 1 franc coins and of four containers $KA_5$, $KA_{10}$, $KA_{20}$, $KA_{50}$ for the 5, 10, 20 and 50 cents coins, respectively.

Each of these containers is provided with a magnetical ejector $MA_5$, $MA_{10}$, $MA_{20}$ and $MA_{50}$, respectively. These ejectors are controlled by the relays $G_5$, $G_{10}$, $G_{20}$, and $G_{50}$ which each comprise a pair of operating contacts $G_{51}$–$G_{52}$, $G_{101}$–$G_{102}$, $G_{201}$–$G_{202}$ and $G_{501}$–$G_{502}$, respectively.

The containers $KA_{20}$ and $KA_{50}$ are supplied from the clippers 13 while the containers $KA_5$ and $KA_{10}$ are periodically refilled.

In the following the operation of the illustrated control device shall be described in more detail.

*Selection of a Goods*

Assuming that the selected goods has the number 23 but that there is no more of this goods in the apparatus. The digit 2 is set with the dial. The relay WR receives two pulses from the relay NSR the contacts of which are closed. The contact pairs $WR_1$–$WR_2$, $WR_3$–$WR_4$ and $WR_5$–$WR_6$ close and open twice. Simultaneously the slagged relay WV is excited over lead 500. The contacts $WV_1$, $WV_2$ open and remain open as long as pulses are supplied. After the last pulse these contacts close again. WV has a small resistance of e.g. 0.5 ohm so that there is practically no current loss. The current flows from WV over lead 501 to the contacts $WU_3$ and $WU_4$ of relay WU. Over the lead 423 the current flows to the dial selector ($HDW_1$, $HDW_2$, $HDW_3$). The movable segments of this dial are moved horizontally about two steps in well-known manner. After the passage of the two pulses the two contacts $WV_1$ and $WV_2$ close again as already mentioned whereby relay WU is excited over leads 420 and 502. The lead 420 is connected to the current source by a not represented change-over switch of the goods selector 11.

The contacts $WU_6$, $WU_7$ are closed, whereby lead 11 is set under current. Thereby relay $VZ_2$ is excited over the closed contacts $VZ_{11}$, $VZ_{12}$ of relay $VZ_1$. The contacts $VZ_{21}$–$VZ_{22}$ and $VZ_{23}$–$VZ_{24}$ are closed. The relay YZ constituted as a generator is excited over lead 503 and the closed contacts $YZ_3$, $YZ_4$. Thereby the contacts $YZ_1$–$YZ_2$ are closed and the lead 5 is set under current. By this excitement of relay YZ the contacts $YZ_3$, $YZ_4$ are opened, the relay is deexcited etc. Thereby pulses are produced in lead 5 which over the lead 405, the contacts $W_{63}$, $W_{64}$, the relay $W_6$, lead 404 and lead 18 attain the dial selector PZ. The latter starts to turn and this under the "slow" operation condition. PZ, on the other hand is connected with the positive pole over lead 504 and the contacts $VZ_{24}$, $VZ_{23}$ of the excited relay $VZ_2$.

Now the second digit "3" is set by means of the dial. Three pulses are guided over lead 8 and the contacts $NSR_1$, $NSR_2$ to WR, the contacts of which open and close three times. The relay WU has remained excited since the set of the digit "2." The pulses coming from WR thus are guided through lead 500, the contacts $WU_5$, $WU_4$, $WU_2$, $WU_1$ lead 521 and lead 422 to the dial selector of the goods selector 11. The latter is displaced vertically about three steps.

At the dial selector there is provided a pair of contacts $D_1$, $D_2$ whereby $D_2$ is connected with the positive pole. This pair of contacts is closed at each step of the dial selector. The slagged relay $W_1$ thus remains excited a corresponding time interval, and releases only when the dial selector stands still. The relay $W_2$ is always excited when the apparatus is switched-in so that the contacts thereof are closed. When the contacts $W_{11}$, $W_{12}$ are opened the current circuit of relay $W_2$ is interrupted, the contacts $W_{23}$–$W_{24}$, $W_{25}$–$W_{26}$ thereof are separated and the contacts $W_{21}$, $W_{22}$ close. Thereby the relay $W_5$ is excited over lead 522 and changes to self-retaining position in which it is held over $WU_8$ and $WU_9$.

Thus contacts $W_{51}$ $W_{52}$ are closed. The contact $W_{51}$ is connected with relay NSR over lead 401. In the meantime relay $W_1$ has been released so that the relay $W_2$ is reexcited. The contacts $W_{23}$, $W_{24}$ are closed. Thereby relay NSR receives a pulse as $W_{51}$ is connected with the positive pole of contact $W_{24}$ over $W_{52}$ and the lead 523. The contacts $NSR_1$, $NSR_2$ open. The dial which is connected over lead 8 now comes out of effect. The indication "select goods" is connected with the contact $A_{10}$ of relay A over lead 27. As the relays A and B are always under current $A_{10}$ is connected with $A_{11}$. The contact $A_{11}$ in turn is connected with contact $W_{53}$ over leads 2 and 403. The current circuit of this indication was closed over $W_{52}$, lead 523, $W_{25}$ and $W_{26}$. With the relay $W_5$ excited $W_{52}$ and $W_{53}$ are separated so that this current circuit is interrupted. The indication "select goods" is switched-off.

First now the current circuit of relay $W_4$ shall be explained in more detail. The relay $W_4$ (negative side) is connected with the closed contacts $WA_{24}$–$W_{23}$ of relay $WA_2$ over lead 415. Contact $WA_{23}$ is connected over leads 525 and 17 with the zero conducter of all feelers 20. These feelers 20, as has already been mentioned, are connected with the goods selecting part $HDW_3$. If goods is present these feelers interrupt the current circuit. If there is no goods the feelers close the current circuit. Thereby the contact $WA_{13}$ is connected over the zero conductor and the closed feeler with the lead 424 connected with the goods selector. The lead 424 in turn is connected over lead 400 with contact $W_{23}$ of relay $W_2$. With the contacts $W_{23}$, $W_{24}$ closed the circuit of relay $W_4$ is closed, as $W_{24}$ is directly connected with the positive pole. Relay $W_4$ thus is excited. The contacts $W_{45}$–$W_{36}$ over lead 410 and the connection 12 switch-in the indication "Goods sold out." Relay $W_6$ is excited over the same contacts and the branch 524 of lead 410. The contacts $W_{61}$–$W_{62}$ close, whereby relay $UZ_1$ is excited over lead 406 and the connection 19. The contacts $UZ_{13}$, $UZ_{14}$ open. The relay YZ working as a generator was up to now continuously operative. It was connected with the negative pole over condenser $K_9$, the closed contacts $VZ_{24}$–$VZ_{23}$ and the contacts $UZ_{14}$–$UZ_{13}$. The condenser $K_{10}$ is aslo continuously connected with the negative pole. As, however, it has a capacity which is substantially smaller (e.g. twelve times) than the condenser $K_9$ the generator YZ emits when the condenser $K_9$ is switched-off twelve times more pulses per time unit. These pulses pass $YZ_2$, lead 526, the closed contacts $UZ_{12}$–$UZ_{11}$ and lead 18 and attain the dial PZ which now works under the "rapid" operation condition, i.e. in accelerated manner.

Resetting of the Whole Apparatus

The dial PZ thus continues until it has effected a full revolution (e.g. 36 steps). In its end position it connects the positive pole ($VZ_{23}$) with the relay HK which remains currentless. The pair of contacts $HK_3$, $HK_4$ closes and thereby excites relay SL over lead 26. The contacts $SL_1$, $SL_2$ close. The circuit including the resistance $O_{11}$ and the condenser $K_{13}$ is closed and the condenser $K_{13}$ may discharge. The third pair of contacts $HK_5$, $HK_6$ opens and thereby interrupts the connection of relay H with the positive pole ($HK_5$) over lead 506. Relay R is released. It should be noted here that the relays R, A, B are excited when the apparatus is switched-in. The pair of contacts $R_1$, $R_2$, $A_4$, $A_5$ and $B_4$, $B_5$ thus are closed. The relay circuits are thus closed over lead 508, contacts $A_4$, $A_3$, lead 510, lead 507 and the contacts $R_1$, $R_2$ for A and over lead 509, the contacts $B_4$, $B_5$ leads 511, 507 and the contacts $R_1$, $R_2$ for B. If $R_2$ is dropped from $R_1$ these circuits are opened.

The relay HY is connected with the positive pole over its contacts $HY_5$, $HY_6$, lead 511 and leads 512 and 513, respectively as well as the pair of contacts $A_8$, $A_9$ and $B_7$, $B_8$ when the relays A, B are not excited. The relay HY is thus excited whereby the contacts $HY_5$ and $HY_6$ are opened. The relay becomes currentless and is released, whereby the delay time is adjustable by means of condenser $K_6$. When the contacts $HY_5$ and $HY_6$ drop again the relay is re-excited, etc.

The contacts $HY_2$ and $HY_4$ are connected with the contacts $A_3$ and $B_3$ over lead 514. The contact $A_3$ is connected with the dial $S_A$ over lead 515 when relay A is currentless. The contact $B_3$ in turn is connected over lead 516 and contact $B_2$ with dial $S_B$ when relay B is currentless. The dials $S_A$, $S_B$ thus receive pulses from HY and start to run. At the end of the run of $S_A$ the lead 517 which is directly connected with relay A is connected with lead 518. The relay A is excited and changes to self-retaining.

At the end of the run of $S_B$ the leads 519 and 520 are connected with each other. In similar way as A also B changes to self-retaining.

The relay HK which is a slow-releasing relay now drops so that relay R is re-excited over $HK_5$, $HK_6$ and lead 506.

The lead 27 leads to the indication lamp Ww (select goods) the other side of which is connected with the positive pole. Over the now closed contacts $A_{11}$, $A_{10}$ the lead 27 is connected with lead 2 the latter being connected with the negative pole. It results therefrom the lighting of the mentioned lamp.

The lead 527 connected with the relay WH is connected with lead 9 over the connection 10, the contact HK, the contact $HK_2$ (HK being at this moment excited). Lead 9 in turn is connected over the closed contacts $WH_5$, $WH_4$ and lead 528 with lead 420 which is connected with the 12th contact of the goods selector. The contacts "12" and "13" of the goods selector are interconnected over the contacts $L_3$, $L_4$. The contact 13 on the other hand is always connected with the positive pole. Thus the relay WH receives a control pulse and changes to self-retaining position. The latter is obtained as follows: The lead 419 is connected to the 8th contact of the goods selector. This 8th contact is connected over the contacts $L_1$, $L_2$ with the 7th contact. To the latter is connected the lead 421 which leads to the contact $WH_3$. Upon receipt of the control pulses $WH_3$–$WH_4$ closes. The contact $WH_4$ is connected with the positive pole over leads 528 and 420, 12th contact of the goods selector, contacts $L_3$, $L_4$ and the 13th contact. The relay thus remains under current between the negative and positive pole. This circuit is only interrupted when the contacts $L_1$, $L_2$ and $L_3$, $L_4$ are opened.

Relay WY is connected with the contacts $WH_3$ and $WH_4$ over the contacts $WY_1$, $WY_2$, the resistance $O_3$ and lead 529. As described above the contact $WH_{11}$ is connected with the positive pole. Thus the relay WY is set under current and starts to emit pulses. These pulses attain over lead 422 the second contact of the good selector. In a manner known per se the dial selector is brought into its starting position. The contacts $L_1$, $L_2$ and $L_3$, $L_4$ open so that the relay WH releases and the relay WY becomes currentless. By the separation of the mentioned contacts the relay WU is no more held. It is connected over the lead 530 the contacts $WV_2$, $WV_1$ and the lead 420 to the 13th contact of the good selector, i.e. to the positive pole. By the separation the contacts $WU_6$, $WU_7$ the lead 11 is separated from the positive pole. Relay $VZ_2$, which was held over this lead drops, relay YZ becomes currentless.

Not Enough Money Inserted

Assuming that the goods with the number 23 is present in the corresponding shaft. As appears from the foregoing the following relays are excited at this time: $W_2$, $W_3$, WU, $YZ_2$, YZ, MPR and of course R, A, B and $WA_2$ which are always under current in the rest position of the apparatus. The contacts $L_1$, $L_2$, $L_3$, $L_4$, $L_5$, $L_6$ and $L_7$, $L_8$ of the goods selector 11 are closed. With the feeler open the described process of the resetting is not initiated. The relay $W_5$ is excited. Lead 522 connects the relay $W_5$ with contact $W_{21}$ which cooperates with contact $W_{22}$. The latter is connected with contact $W_{59}$ over lead 531. The contact $W_{58}$ is connected over the leads 402 and 420 with the positive pole in HDW. It results therefrom that the relay $W_5$ receives a control pulse. It is excited and held over lead 409. The latter is connected over the contacts $WU_8$, $WU_9$ and lead 408 with contact $W_{57}$ which, in the excited state of relay $W_5$ is connected with $W_{58}$. The latter is connected to the positive pole over leads 402, 528 and 420. The relay $W_5$ now controls the lighting of the lamp $Ge$ ("Insert money") and the opening of the lock 14. The lamp $Ge$ is always connected with one side to the negative pole. With its other side it is connected to lead 13. The latter is connected with the contacts $W_{35}$, $W_{36}$ over lead 411. The contact $W_{36}$ is connected over lead 532 with the pair of contacts $W_{41}$, $W_{42}$. Over the leads 533, 534, the contacts $W_{54}$, $W_{55}$, the lead 523 and the contact $W_{23}$ the lamp $Ge$ is connected with the positive pole of contact $W_{24}$.

Relay MPR is connected, in its rest position, over the leads 535, 15, 413, 536, the contacts $W_{56}$, $W_{55}$, lead 523 and the contact $W_{23}$ to the positive pole ($W_{24}$). If now $W_5$ is excited $W_{55}$ and $W_{56}$ are separated and the relay MPR releases. The contacts $MPR_1$, $MPR_2$ close and magnet MPM is excited over lead 22. The lock 14 is also excited. This means that the coins do no more directly reach the opening 5 but that they are tested and classified in the coin-tester.

The dial selectors $S_A$ and $S_B$ are in their starting position, i.e. they are ready to count the pulses produced by the insertion of money into the apparatus. The dial selectors $P_2$–$P_5$ are in the following positions. On the right hand side of the dial there are arranged driving or control contacts while on the other side there are arranged pick-up contacts. The dial $P_2$ makes four steps for each pulse and remains on the 4th, 8th, or 12th. For each four steps two pulses are taken up at the left. The dial $P_3$ makes twelve steps for each pulse. It always remains on the 11th contact. For each twelve steps five pulses are taken up at the left. The dial $P_4$ makes twelve steps per pulse whereby five pulses are taken up at the left. The dial $P_5$ also makes twelve steps per pulse and five pulses too are taken up at the left so that $P_4$, $P_5$ together generate 10 pulses.

Assuming that a 20 cent coin is inserted so that the contact $k_3$ is actuated. Over the leads 25 and 207 a pulse is led to relay $I_2$ which thereby is excited and changes to self-retaining position. By closing the contacts $I_{28}$, $I_{29}$ the relay IA receives a pulse over lead 536 and closes shortly. $I_2$ is held over $IA_5$ and $IA_6$. $I_2$ drops when the dial $P_2$ remains stationary on its 4th, 8th or 12th right contact. The relay GY is connected over lead 539 to the positive pole and thus is excited. It generates pulses until the relay $I_2$ drops back, i.e. until it is no more held by $P_2$. Over the pair of contacts $I_{211}$, $I_{212}$, the contacts $GA_2$, $GA_3$, leads 301, 13, 411, the contacts $W_{35}$, $W_{36}$ of the released relay $W_4$, leads 533, 534, contacts $W_{54}$, $W_{55}$ of the excited relay $W_5$, lead 523 and the contacts $W_{23}$, $W_{24}$ of the excited relay $W_2$ the relay GA has received a pulse and has changed to its self-retaining position. Over contacts $GA_2$, $GA_4$, $GA_5$ and the leads 302, 34 the current circuit of the lamp $Wg$ is closed. As will be described at a later stage this circuit is immediately interrupted if already enough money has been inserted. The lamp $Wg$ in such a case is not really lighted.

During the foregoing processes the insert of the coins is again locked, as the relay MPR is connected with the positive pole over leads 535, 304, contacts $I_{28}$, $I_{27}$, leads 303, 14 and 534, contacts $W_{54}$, $W_{55}$, lead 523 and the contacts $W_{23}$, $W_{24}$. The relay MPR is again excited and the magnet released.

Now two pulses are taken up at the left side of the dial $P_2$. These pulses are led over lead 540, 541 to $I_1$ which thus is excited a second time. Simultaneously the receipts counter is supplied over the leads 540, 310 and 29.

The pair of contacts $I_{11}$, $I_{12}$ is connected with the relay of the dial selector $S_A$ over leads 546, 309, contacts $U_5$, $U_6$, leads 543, the excited contacts $A_1$, $A_2$ and lead 515. This relay receives two pulses and $S_A$ effects two steps. The pair of contacts $I_{13}$, $L_{14}$ is connected over lead 308, contacts $F_6$, $F_7$ of the dropped relay F and lead 28 with the turnover or sale counter which thus is also supplied.

The relay $VZ_1$ is connected with the pair of contacts $I_{16}$, $I_{15}$ over lead 300. The contact $I_{15}$ is connected over the leads 343, 528, 420 with the 12th contact of the good selector 11 which contact is connected with the positive pole (13th contact) over the contacts $L_3$, $L_4$. This relay $VZ_1$ is a slow-releasing relay, i.e. it is always excited as long as it receives pulses. In the excited state of this relay the contacts $VZ_{11}$, $VZ_{12}$ are separated. Thereby the current circuit of the relay $VZ_2$ is interrupted. The latter was held over $VZ_{11}$, $VZ_{12}$, lead 11 and the contacts $WU_6$, $WU_7$ of the excited relay WU. By the releasing of relay $VZ_2$ the relay YZ is switched-off. This time dial PZ thus remains stationary. As soon as relay $I_1$ drops the original state is re-established.

Thus, if no further coins are inserted, the paid amount does not attain the price of the goods. The apparatus does not deliver the goods and is automatically reset, whereby the inserted money is returned. This is obtained as follows:

The time dial PZ continues to rotate and at the end of its run it closes, as has already been described, over lead 505 the circuit of relay HK. Over lead 506 and the contacts $HK_6$, $HK_5$ the relay R was under current. When the relay HK is excited the current circuit is interrupted and the relay R releases. The contacts $R_2$, $R_3$ are closed and the current circuit of the magnets of the clippers 13 is closed over lead 13. The money inserted into the apparatus (20 cents) falls into the opening 5. If the relay R releases shortly, the relays A, B also release from their self-retaining position. The contacts $A_5$, $A_6$ close and prepare the new self-retaining position. The contacts $A_2$ and $B_2$ start the pulses to $S_A$ and $S_B$, respectively. These pulses come from relay HY over the contacts $HY_1$, $HY_2$, lead 543 and the contacts $A_3$ and $B_3$ which are interconnected. The dials $S_A$, $S_B$ receive pulses until they reach the end of their run, whereupon A and B receive a pulse and change to their self-retaining position. Thereby also relay HY is released. The dials $S_A$, $S_B$ are back in their starting position and are ready for the next operation.

*Enough Money Inserted*

The number 23 of the goods is set. Assuming that the price of the goods is 20 cents. Thus on the price table the terminal corresponding to the goods 23 is connected with the terminal corresponding to the price of 20 cents. The dial $S_A$ of detector I effects two steps and stops. It closes a circuit exciting the relay F over the goods selector (in position 23).

The relay F is connected over lead 544 with lead 20 which in turn is connected over lead 418 with the 18th contact of the goods selector 11. The goods selector 11 is connected with the dial selector $S_A$ over the dial and the price table. This side of the dial selector $S_A$ is connected over lead 545 with the released contacts $U_2$, $U_3$. Over lead 546 the contact $U_2$ is connected with the contacts $F_3$, $F_2$ of relay F and thus with the positive pole. The described electrical circuit is thus closed and the relay F is excited. The circuit is interrupted but the relay does not release as it is held over lead 547. The latter is connected with the pair of contacts $R_4$, $R_5$ of the excited relay R. The contact $R_5$ now is connected with contact $F_1$ over lead 548. Thus relay F is in self-retaining position.

The operation of the contacts $F_4$, $F_5$ shall be explained later-on in connection with the delivery of the excess money.

The relay $W_3$ up to now was held by contact $F_8$ over leads 414, 16 and the contact $F_9$. As soon as relay F is excited $W_3$ drops. Thereby through the releasing of the contacts $W_{35}$–$W_{36}$ the circuit of the lamp $Ge$ is interrupted. The contacts $W_{36}$, $W_{37}$, however, switch-in lamp $Gg$. This lamp is on the one hand connected with the negative pole and on the other hand with lead 7. Over lead 407, the contacts $W_{37}$, $W_{36}$, lead 523, the contacts $W_{41}$, $W_{42}$ (of the released relay $W_4$), the lead 533, lead 534, the contacts $W_{54}$, $W_{55}$ (of the excited relay $W_3$), the lead 523 and contact $W_{23}$ this lead 7 is connected with the positive pole of contact $W_{24}$ of the excited relay $W_2$.

Owing to the drop of contact $W_{33}$ onto the contact $W_{34}$ relay $WA_1$ is excited over lead 426. Relay $WA_1$ is slowly excited. Due to the separation of $WA_{13}$, $WA_{14}$ the slow release of relay $WA_2$ is produced. Owing to the delay occuring in the release of relay $WA_2$ a pulse may reach $WA_3$ and excite it from $WA_{11}$, $WA_{12}$ over lead 544, the contacts $WA_{22}$, $WA_{21}$ and lead 550.

The contacts $WA_{33}$, $WA_{34}$ and $WA_{35}$, $WA_{36}$ thus are connected in parallel as contact protection. In some cases a conveyor band is provided in the apparatus for conveying the goods. This band may be driven by a motor. The circuit of this motor $Mo$ is then closed over the contacts $WA_{31}$, $WA_{32}$ and the leads 4 and 41. The control of the motor switch is effected over lead 6. The leads 4 and 41 are connected with the current source over the leads 205, 206. The circuit of the ejectors 21 is closed over lead 4, the contacts $WA_{35}$, $WA_{36}$, lead 425 and the 17th contact of the goods selector, the other side of the ejectors being connected to lead 41. According to the position of the goods selector it is of course the current circuit of the corresponding ejector which is closed.

After the drop of $W_3$, $W_4$ and the action of $W_5$, $W_2$ the state "enough money" is realized so that the corresponding lamp is lighted and lead 7 is under current. Over the connections 551 the clippers 13 are operated in such manner that the inserted money falls into the containers Ka.

As soon as lead 7 is under current the relay $SV_2$ is excited over the contacts $SV_{13}$, $SV_{14}$, the resistance $O_{12}$ and the condenser $K_{13}$. Thereby $SV_{13}$, $SV_{32}$ are closed. Thus relay S2B is excited over lead 211. The contacts $S2A_1$, $S2A_2$ up to now held the relay S2B in self-retaining position. Owing to the release of this relay its contact $S2B_4$ is connected with relay S2Y over the contact $S2B_5$, lead 202, the contacts $SV_{21}$, $SV_{22}$ of the relay $SV_2$ held by relay $SV_1$ and lead 203. The relay S2Y generates pulses which are directed to the detector $S_2$ over lead 551. As soon as lead 7 is under current, i.e. as soon as enough money has been inserted the dial of the detector $S_2$ starts to run.

The fifth row of contacts of this dial is always connected with the positive pole. Thus after nine steps of the dial, lead 21 is connected with the positive pole over lead 21. Thereby a pulse attains relay $UZ_2$ which is ex-excited and held by relay R. Thereby the timer PZ is operated as already described.

The detector $S_2$ makes three further steps whereafter the relay S2B receives a pulse over lead 552 and changes to self-retaining position. Thereby S2Y is released and the detector $S_2$ stops. As soon as relay F changes to self-retaining relay $W_3$ drops as already mentioned. Over the contacts $W_{33}$, $W_{34}$, leads 426, 413, 15 and 535 the relay MPR is excited and the further money insert is locked. If further coins are inserted they fall directly into the opening 5.

*Too Much Money Inserted*

Assuming that the good "23" set which costs 20 cents and that a 1 franc coin is inserted. The terminal "23" of the list or table of goods W is connected with the terminal "20 cents" of the price table P. Over contact $K_1$, leads 23 and 305 the relay $I_4$ receives a pulse, changes to self-retaining position and switches-in the relay GY supplying the dial selector $P_4$ with pulses. The dial $P_4$ moves forwardly, interrupts on the right-hand 10th segment the self-retaining of relay $I_4$ and stands still. However a pulse was taken up at the left-hand 9th relay, and this pulse is guided to relay $I_5$ over lead 553. This relay $I_5$ is excited and changes to self-retaining. This results in the relay GY remaining excited and supplying the dial $P_5$ over its contacts $GY_9$, $GY_{10}$ with pulses. The dial $P_5$ progresses and stands still on the 5th right-hand segment. At this moment relay $I_1$ is released this resulting in the relay GY being switched-off. A pulse is taken up from each of the left-hand segments 2, 4, 6, 8 and 11 of dial $P_4$ and from the left-hand segments 2, 4, 8, 10 and 12 of the dial $P_5$. These pulses arrive to contact $I_{511}$ over lead 554 and to contact $I_{59}$ over lead 555. The relay $I_1$ is thus excited ten times over the contact $I_{510}$ and the leads 310 and 541.

Over the contacts $I_{11}$, $I_{12}$, the leads 542, 309, the contacts $U_5$, $U_6$ of the released relay U, lead 543, the contacts $A_1$, $A_2$ of the excited relay A and the lead 515 the dial selector $S_A$ of the detector I also receives ten pulses. It thus progresses about ten steps and stands still.

The contacts $I_{13}$, $I_{14}$ are connected with the not represented counter over the leads 308, the contacts $F_6$, $F_7$ of the actually released relay F and the lead 28. The counter, as shall be explained hereafter receives two pulses.

On position 2 (20 cents) the dial selector $S_A$ has closed the already described circuit. The relay F changes to self-retaining and liberates the goods.

As soon as the relay F changes to self-retaining the contacts $F_4$, $F_5$ are closed. Over lead 556, the counter contacts $AK_{21}$, $AK_{22}$ and the lead 30 the low-ohmic relay $SV_1$ is excited. The contacts $SV_{11}$, $SV_{12}$ are separated and relay $SV_2$ is released. The contacts $SV_{21}$, $SV_{22}$ interrupt the current supply to relay SYZ so that the detector $S_2$ stands still.

Over lead 204, the contacts $SPR_{21}$, $SPR_{22}$ of the excited relay $SPR_2$ and lead 557 the store 22 receives the remaining eight pulses so that it effects eight steps.

Relay $SV_1$ is a slow-releasing relay and remains excited during the passage of the pulses. By the abovementioned release of relay $SV_2$ the relay S2A is excited over lead 200 and the contacts $SV_{24}$, $SV_{23}$. This interrupts the self-retaining of relay S2B.

After the passage of the eight pulses relay $SV_1$ is released again. Relay S2Y is again supplied with current over the relay $SV_2$ which is excited again and the pulses generated by relay S2Y drive the detector $S_2$ over lead 551. The detector $S_2$ starts to run and scans the store 22. The detector $S_2$ is provided with six rows of contacts having 13 contacts each. The first three rows (from left to right) serve to operate the delivery of 10, 20 and 50 cents. The fourth row controls the delivery of the 5 cents which shall be explained later. The fifth and sixth rows serve to operate the general reset of the whole apparatus.

The store stands on its 9th segment after having made eight steps. The contact rows 1, 2, 3, 4 are connected over leads 213, 212, 214 and 211 with the relays $G_{10}$, $G_{20}$, $G_{50}$ and $G_5$. If now the detector $S_2$ moves the following circuits are closed:

(a) As soon as the 7th contact of the first row is attained the positive pole, which is always applied to store 22 is applied over this 7th contact, the detector and lead 213 to relay $G_{10}$. This relay is thus excited once resulting in one actuation of the coin ejector $MA_{10}$.

(b) When the 9th contact of the second row of contacts is attained relay $G_{20}$ is excited over lead 212 whereby the coin ejector $MA_{20}$ is actuated once.

The detector $S_2$ continues to turn whereby, when the 10th contact of the 5th row of contacts is attained, the resetting of store 22 is initiated. A pulse reaches relay $SPR_1$ over lead 558. This relay is excited, whereafter relay $SPR_2$ is released from its self-retaining position. The relay SPY is excited over the contacts $SPR_{27}$, $SPR_{28}$, and generates control pulses for the store 22. These pulses attain the store 22 over lead 559, the released contacts $SPR_{22}$, $SPR_{23}$ and lead 557. At the end of the run of the detector the leads 560, 561 are connected with each other whereby a pulse attains relay $SPR_2$ which changes to self-retaining. Thereby relay SPY is switched-off. In the meantime the dial selector $S_2$ has progressed whereby after the 11th contact of the 5th row has been reached the relay $SPR_1$ is no more held over lead 558 and thus is released.

When the 12th contact of the sixth row is attained the relay S2B is excited over lead 552. Thereby the relay S2Y is released. The detector $S_2$ stands still. When the 9th contact on the 5th row is attained a pulse reaches relay $UZ_2$ over the leads 216 and 21 so that this relay is excited. This results in the timer PZ being switched to "fast" and the whole apparatus is reset into its original position.

In the following there shall be described the special arrangement provided in order that not only prices of 10 cents price difference but also prices with only 5 cents difference may be used. To this end several relays C connected in parallel are provided between the goods table W and the price table P. In the represented embodiment it is assumed that the goods O1 costs 15 cents. The terminal O1 is connected on the one hand with the detector I and on the other hand over a relay C with the terminal 20 of the price table P. If the goods O1 is selected and provided that enough money has been inserted a current flows between the detector I and the goods selector 11. Thereby the relay C is excited and the contacts $C_1$–$C_2$, $C_3$–$C_4$ are closed. The relay C is held over the contacts $C_1$–$C_2$. When the detector II reaches the 7th contact of the 4th row it takes over the pulse stored by relay C over lead 215, whereby relay $G_5$ is excited over lead 211. Thus relay $G_5$ actuated the coin ejector $MA_5$. Upon subsequent release of relay R the lead 32 becomes currentless so that relay C is released. In the represented embodiment there are provided four relays C but it is of course possible to provide a greater number of such relays.

The indicator 9 is connected to the goods selector 11 in parallel in a manner not shown. It reproduces in known manner the selected number. The counter 7 is connected on the one hand to the negative pole and on the other hand with lead 542 (not shown) and thus with relay $I_1$.

Consequently, while I have shown and described what is now thought to be the preferred form of the invention as applied to a goods or ticket retailer, it is to be understood that the same is susceptible of other forms and expressions. Consequently, I do not limit myself to the precise structure shown and described hereinabove, except as hereinafter claimed.

I claim:
1. In a computing electrical control device for an automatic goods dispenser, the provision of a goods selector, a settable price table, a first detector connected with said selector over said price table, a pulse analyzer generating pulses in accordance with the money inserted into the device, means for guiding the pulses generated by said analyzer to said first detector, means controlled by the latter for delivering a selected goods after receipt of pulses corresponding to the amount required for such goods, a store connected with said first detector and arranged to store pulses corresponding to the amount of inserted money in excess of the amount required for the selected goods, a second detector arranged to scan said store, a coin delivering device operated by said second detector to return the money inserted in excess, clippers adapted to receive the coins inserted into the dispenser, said clippers being controlled by the first detector and being adapted to guide the received coins into the till and to return them, a timer connected to be released when the selected goods is dialed, means adapted to return the whole of the inserted money at the end of the run of the timer should the inserted amount not attain the price of the selected goods.

2. A control device as claimed in claim 1, comprising a coin tester receiving the inserted coins and having means for checking and classifying the received coins, said coin tester having channels for guiding the classified coins, said channels being provided at their ends with contacts connected with the inlet of the pulse analyzer.

3. A control device as claimed in claim 2, in which the coin tester is provided with a lock which, upon selection of a goods and if such is present, is opened and which is closed if the price is attained or the goods is sold out.

4. A control device as claimed in claim 3, comprising means for maintaining the lock after the insert of each coin and until the corresponding pulses have been counted by the first detector.

5. A control device as claimed in claim 4, comprising means for releasing the timer during the counting of the pulses corresponding to the inserted money.

6. A control device as claimed in claim 5, in which the detector is adapted to count all pulses corresponding to the inserted money whereby the store is connected with this detector only after the amount of the price of the selected goods has been attained so that only the surplus pulses are stored.

7. A control device as claimed in claim 6, in which the store comprises eleven contacts corresponding each to a surplus pulse.

References Cited in the file of this patent

UNITED STATES PATENTS

| | | |
|---|---|---|
| 2,323,255 | Sutherland | June 29, 1943 |
| 2,593,102 | Caruso | Apr. 15, 1952 |

FOREIGN PATENTS

| | | |
|---|---|---|
| 137,543 | Great Britain | Apr. 11, 1921 |